United States Patent Office 3,402,108
Patented Sept. 17, 1968

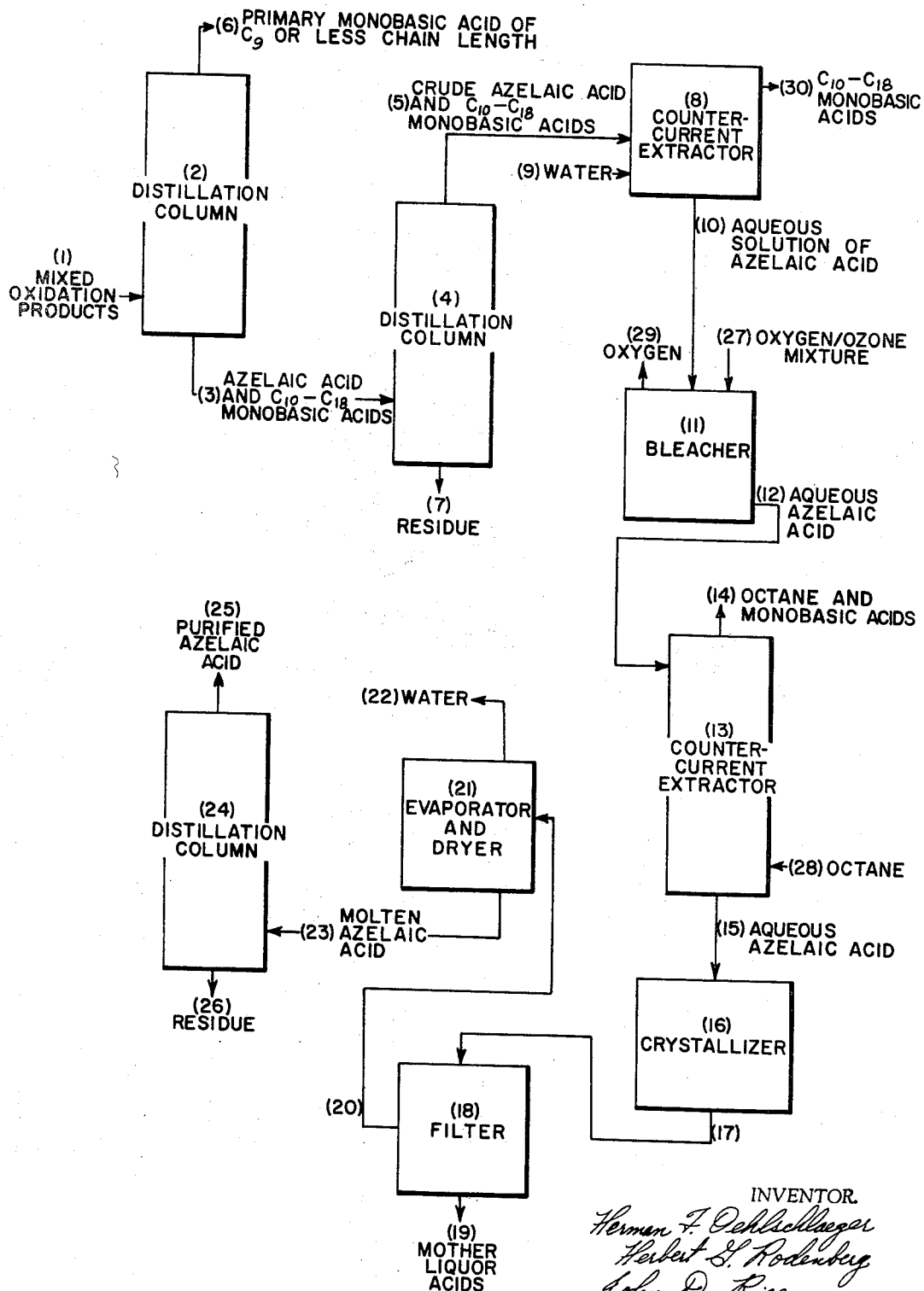

3,402,108
PROCESS FOR THE PRODUCTION OF A PURIFIED GRADE OF AZELAIC ACID BY TREATMENT WITH OZONE DURING PURIFICATION
Herman F. Oehlschlaeger and Herbert G. Rodenberg, Cincinnati, Ohio, assignors to Emery Industries, Inc., Cincinnati, Ohio, a corporation of Ohio
Filed July 7, 1966, Ser. No. 563,363
3 Claims. (Cl. 203—31)

ABSTRACT OF THE DISCLOSURE

A process for purifying azelaic acid from a mixture of oxidation products formed by the oxidation of unsaturated acids such as oleic acid which comprises distilling the mixed oxidation products resulting from the oxidation of unsaturated acids to remove monobasic acids having 9 or less carbon atoms, distilling from the residue azelaic acid, other dibasic acids, and remaining monobasic acids having more than 9 carbon atoms, principally $C_{14}$ to $C_{18}$ acids, dissolving the resulting distillate in hot water to form an aqueous solution of dibasic acids contaminated with some residual quantities of monobasic acids having more than 9 carbon atoms, passing ozone-containing oxygen through the aqueous solution, extracting the aqueous solution with a non-polar hydrocarbon solvent to remove the remaining monobasic acids, and recovering azelaic acid from the raffinate by crystallization.

---

This invention relates to a method for the production of azelaic acid of improved properties and purity from unsaturated fatty acids such as oleic acid or any other acid which can be oxidized with ozone to produce azelaic acid, or from materials containing such unsaturated fatty acids. More particularly, the invention resides in a method of obtaining azelaic acid of exceptionally low monobasic acid content, improved color and color stability, and a $C_9$ dibasic acid content of at least about 90% by weight.

Azelaic acid is a saturated aliphatic $C_9$ dibasic acid having the formula $COOH(CH_2)_7COOH$ (nonanedioic acid). It is a commercial product having application wherever aliphatic dibasic acids of similar chain length are important as chemical intermediates. For some purposes it is preferred because its uneven numbered carbon chain provides lower melting points for its various derivatives.

One of its outstanding applications is in the field of plasticizers where monohydric alcohol esters of azelaic acid are extensively used as monomeric plasticizers for polyvinyl chloride, nitrocellulose, ethylcellulose, cellulose acetate-butyrate resins, and for synthetic rubber. In addition, polyesters formed from azelaic acid and polyhydroxy alcohols provide polymeric plasticizers having high performance, low migration, outstanding compatibility, and unique low-temperature characteristics.

Azelaic acid is also used in producing polyesters of the alkyd resin type for casting, potting, laminating, adhesives, paper coatings, and in the preparation of polyesters for polyurethane resins. Still another important use for monomeric azelaic acid esters of low molecular weight alcohols is in synthetic ester lubricants which exhibit excellent viscosity-temperature characteristics, and low coking properties.

In a number of the applications above-mentioned, the presence of appreciable quantities of monobasic acids or other contaminants in the azelaic acid and its resulting derivatives is particularly undesirable. For example, in polymeric plasticizers based on azelaic acid polyesters and in other polyester applications, the presence of monobasic acids may lead to a shorter chain length or lower average molecular weight than desired. Moreover, some difficulty may be encountered in reproducing molecular weight and properties because of the variation in quantity of these chain stopping monobasic acids. Also, in synthetic ester lubricant applications, it is observed that presence of monobasic acids may have an adverse effect on the viscosity-temperature (slope) characteristic of the lubricants.

Azelaic acid is now produced by ozonization of commercial oleic acid, decomposition of the ozonide, and oxidation of the decomposition products to form essentially two co-products:

(1) dibasic azelaic acid, and
(2) monobasic pelargonic acid (nonanoic acid). Other oxidizing methods and agents may be employed which cause cleavage oxidation such as chromic-sulfuric acid mixtures. This ozonization method for production of azelaic acid is set forth in U.S. Patent 2,813,113 dated Nov. 12, 1957 which is incorporated herein by reference. The chromic-sulfuric acid oxidation method is described in U.S. Patent 2,450,858.

The reaction mechanism is complex and the oleic acid feed stock usually contains varying quantities of saturated higher fatty acids ($C_{14}$ to $C_{18}$), some diunsaturated acids, e.g. linoleic acid, and some isomeric $C_{18}$ monounsaturated acids, e.g. vaccenic, where the double bond is in other than the nine (9) position. Consequently, the mixed oxidation products of the process include varying quantities of the following substances as products or unconsumed reactants:

(1) Monobasic acids in the range from about $C_5$ (valeric) to $C_{10}$ (capric), principally pelargonic acid ($C_9$).

(2) Unreacted and possibly reaction-formed monobasic acids, principally saturated in the range above $C_{10}$ up to $C_{18}$, principally $C_{14}$ to $C_{18}$, such as myristic, palmitic and stearic.

(3) Saturated dibasic acids in the range from about $C_4$ to $C_{11}$, principally azelaic acid ($C_9$).

Various treatments of these oxidation products have been suggested for recovery of azelaic and pelargonic acids. Recovery of azelaic acid is detailed in U.S. Patent 2,813,113, above referred to and also in U.S. Patent 2,998,439. These treatments, however, are incapable of providing a highly refined or purified azelaic acid comparable to that produced by the present invention. The distillation of the mixed oxidation products (MOP) followed by water extraction of the second distillate as shown in 2,813,113 cannot provide a purity of at least 90% azelaic acid or the color or color stability attained by the present invention.

It is, therefore, a primary object and advantage of the invention to provide highly purified azelaic acid from mixed oxidation products from the cleavage oxidation of raw materials containing oleic acid. Another object is to provide azelaic acid of at least 90% purity with exceptionally low monobasic acid content, e.g. 0.1% or less, and having improved color and color stability.

It is a further object of the present invention to provide an improved method for preparing a pure azelaic acid in which an ozonization step is used in the purification process.

These objects and other advantages are accomplished by employing a combination of steps in a particular sequence.

The process of this invention may be conducted as follows:

The total mixed oxidation products from the cleavage oxidation of oleic acid are subjected to distillation to reduce the hydrocarbon-soluble content of the products by removal primarily of the monobasic acids of $C_9$ and lower carbon chain length, including the relatively large quantities of pelargonic, usually about 40% of the oleic acid. The dibasic acids in the product are then distilled from the residue of the first distillation together with those remaining monobasic acids of higher than $C_9$ chain length, principally $C_{14}$ to $C_{18}$ unreacted saturated fatty acids which are volatile with the dibasic acids. This dibasic acid-monobasic acid distillate is then extracted in hot water to form a hot aqueous solution of the water-soluble dibasic acids with which a small portion of the residual water-insoluble monobasic acids is extracted due to association with the dibasic acids or increased water-solubility in the presence of the dibasic acids. The resulting hot aqueous solution is subjected to bleaching with ozone-containing oxygen, and thereafter it is subjected to extraction, preferably countercurrently, with a non-polar hydrocarbon such as octane. The raffinate is then crystallized and the purified acid is recovered. The azelaic acid may be further purified by distillation of the acid obtained in the crystallization step.

It is important that the sequence of steps in the present process be followed precisely in the manner described above in the ozone treatment and countercurrent solvent extraction steps. This order of processing the azelaic acid enables production of an improved product while utilizing a process free from the safety hazards of prior methods of operation.

The process of the present invention is illustrated schematically in the drawing. The mixed oxidation products resulting from the oxidation of oleic acid are passed from line 1 into distillation column 2, where the monobasic acids having a $C_9$ or less chain length are evaporated and removed through line 6 to a collecting vessel. The azelaic acid and monobasic acids having a chain length greater than $C_9$, principally $C_{14}$ to $C_{18}$ monobasic acids, are passed from column 2 through line 3 into distillation column 4 where the azelaic acid and remaining monobasic acids are distilled and passed through line 5 to the countercurrent extractor 8. The residue from the distillation of the azelaic acid and the monobasic acids is withdrawn through line 7. Water is injected through line 9 into countercurrent extractor 8 and an aqueous solution containing the azelaic acid is passed through line 10 to bleacher 11. The monobasic acids are removed via line 30. The azelaic acid solution is treated with ozone fed into bleacher 11 through line 27 in the form of an oxygen/ozone mixture. Oxygen gas is removed via line 29. After bleaching, the aqueous azelaic acid solution is conducted to countercurrent extractor 13 where the monobasic acids are extracted by a hydrocarbon solvent such as octane which is introduced to the extractor through line 28. The monobasic acids and hydrocarbon solvent are removed through line 14 leaving the aqueous azelaic acid solution which is removed through line 15 to crystallizer 16. The crystallized acid is conveyed by line 17 to filter 18 where it is separated from the mother liquor and the filter cake is passed through line 20 to evaporator and dryer 21. Water is removed through line 22 from the evaporator-dryer and the molten azelaic acid is passed through line 23 to distillation column 24 and the residue remaining is removed through line 26.

The invention is more particularly described in the following example which provides a complete specific embodiment of the best mode presently known for practice of the invention.

Example I

Mixed oxidation products obtained by ozonization and cleavage oxidation of 1000 pounds of commercial oleic acid according to the method of U.S. Patent 2,813,113 is subjected to the treatment described below. The oleic acid analyzed as a typical commercial acid as follows:

| | Percent |
|---|---|
| Saturated fatty acids | 10 |
| $C_{14}$—3% | |
| $C_{16}$—5% | |
| $C_{17}$—1% | |
| $C_{18}$—1% | |
| Monounsaturated fatty acids | 81 |
| Myristoleic $C_{14}$—1.5% | |
| Palmitoleic $C_{16}$—6.0% | |
| Oleic—73.5% | |
| Polyunsaturated fatty acids | 9 |
| Linoleic $C_{18}$—8% | |
| Linolenic $C_{18}$—1% | |
| | 100 |

These mixed oxidation products from the reactor are subjected to distillation at a temperature of 230° C. with a vacuum of 25 mm. Hg. The distillate contains 900 pounds of mixed monobasic acids of about 80% by weight pelargonic and 20% of lower molecular weight $C_5$ to $C_8$ alkanoic acids.

This distillate represents about 40% of the total oleic acid feed not counting the 500 pounds of pelargonic acid used for a circulating medium in the ozonization and oxidation stages.

The dibasic acid-containing residue remaining from the first distillation was subjected to distillation at a temperature of 270° C. at a pressure of 3 to 4 mm. Hg and the still residue was discarded. The distillate amounted to 670 pounds and contained substantially all of the azelaic acid, other dibasic acids, and some longer chain monobasic acids (greater than $C_9$), principally unreacted saturated fatty acids of $C_{14}$ to $C_{18}$ chain length. This distillate was then subjected to repeated extractions with boiling water to dissolve the azelaic acid and other water-soluble dibasic acids and to separate the bulk of the long chain higher fatty acids which are water-insoluble.

The combined water extracts were then pumped into a tank where the azelaic acid-containing aqueous solution was bleached for four hours at 80 to 90° C. by passing oxygen gas containing about 2% ozone through the solution. The bleached solution was then subjected to a countercurrent extraction in a York-Scheibel extraction column at a temperature of 80 to 85° C. with a feed rate of 225 pounds per hour using as an extractant Skellysolve V petroleum solvent (naphtha mineral spirits) fed at 50 pounds per hour. The raffinate was then pumped through a crystallizer where it was cooled to room temperature to crystallize out the azelaic acid, the crystals then being filtered and washed. Preferably the wet filter cake is dried in an evaporator by heating at 115° C. and 26 mm. Hg. The dry cake is distilled at 225° C. under 2 mm. Hg to recover purified azelaic acid of improved color.

A typical composition (percent by weight) of azelaic acid purified as described above is given in terms of the gas chromatographic analysis of methyl esters of the product.

| | | |
|---|---|---|
| $C_9$ dibasic acid-azelaic | 92.00 | 92.40 |
| $C_{10}$ dibasic | 1.20 | 1.20 |
| $C_{11}$ dibasic | 5.60 | 5.47 |
| Other dibasic acids | 1.16 | .90 |
| Monobasic acid | 0.04 | 0.03 |

The color of such purified azelaic acid products as read using a 25 mm. x 105 mm. cuvette and a Coleman Model 6B Spectrophotometer ranges from 88–97/96–100 and the color stability from 76–88/95–98. The two digit figures before the slant line indicate the percentage of light transmission at 440 mmu (yellow) and the figures following the slant line indicate percentage of light transmission at 550 mmu (red). The color measurement indicates the initial color of the sample and the color stability indicates the change in color transmission after holding a sample in a large test tube exposed to air at 205° C. for two hours.

By comparison a typical azelaic acid composition (percentage by weight) recovered by the method of U.S. Patent 2,813,113 as determined by gas chromatographic analysis of the methyl esters is shown below:

| | |
|---|---|
| $C_9$ dibasic-azelaic | 85.00 |
| $C_{10}$ and higher dibasic | 5.50 |
| $C_8$ and lower dibasic | 8.00 |
| Monobasic | 1.50 |
| Color | 27/77 |
| Color stability | 6/30 |

Examples II and III

To illustrate the advantages of the ozone treatment, particularly on color stability, the following tests were conducted:

A 10% solution of azelaic acid water extract as prepared according to Example I (before ozone treatment) was divided into two parts and treated as follows:

Solution 1.—The aqueous solution of azelaic acid was extracted with a petroleum solvent, Skellysolve V mineral spirits, without the preliminary ozone bleaching step and was then crystallized, washed, dried and distilled all as in the example.

Solution 2.—The aqueous solution of azelaic acid was treated the same as Solution 1 except that it was subjected to ozone bleaching with about 2% ozone being passed through the solution prior to the solvent extraction step.

| Solution | Color | Color stability |
|---|---|---|
| 1 | 95/100 | 85/97 |
| 2 | 98/100 | 92/99 |

The color and color stability, particularly the latter more important factor, were very significantly improved.

Examples IV–VIII

Samples of azelaic acid produced as in Example I (Azelaic 1) and azelaic acid recovered as described in U.S. Patent 2,813,113 (Azelaic 2) were converted to esters and used as viscosity index improvers in a synthetic ester lubricant.

The esters were prepared by separately reacting one mole of Azelaic 1 and Azelaic 2 with 0.5 mole of neopentyl glycol and 0.5 mole of ethylene glycol along with 0.1% by weight of zinc acetate. The resulting Azelaic 1 ester had a yellow color and did not flow. The Azelaic 2 ester was dark brown and viscous. The Azelaic 1 and Azelaic 2 esters were then added to di-ethylhexyl azelate synthetic lubricant bases (Plastolein 9058) and various viscosity measurements were made. The results are shown in Table I below.

TABLE I

| Ex. | Material | Weight percent of ester added | 120° F. Viscosity, cs. | 100° F. Viscosity, cs. | ASTM Slope | Selby Factor |
|---|---|---|---|---|---|---|
| 4 | Di-ethylhexyl azelate synthetic lube base (Plastolein 9058). | 0 | 3.02 | 10.9 | 0.711 | |
| 5 | Azelaic 2 ester | 4 | 4.35 | 13.8 | 0.568 | 1.09 |
| 6 | Azelaic 1 ester | 4 | 5.48 | 14.4 | 0.468 | 1.46 |
| 7 | Azelaic 2 ester | 8 | 6.90 | 17.1 | 0.392 | 1.61 |
| 8 | Azelaic 1 ester | 8 | 9.66 | 18.6 | 0.266 | 2.21 |
| | Desired Value | | (¹) | (¹) | (²) | (¹) |

¹ Higher.   ² Lower.

As the above data indicates, the viscosity characteristics of the blend with the purified azelaic (Azelaic 1) ester were very significantly increased in each instance over those achieved with the less pure azelaic acid.

The advantages of the invention are also reflected in still another application for derivatives of azelaic acid. Diesters of azelaic acid, such as di-2 ethylhexyl azelate, utilized as plasticizers for polyvinyl chloride resin films generally show an improvement in the brittle point of the plasticized resin when the azelate ester is derived from azelaic acid prepared according to the invention compared to that recovered in accordance with U.S. Patent 2,813,113.

The specific conditions for the various operations of the purification process of the invention may be rather widely varied. For example, the distillation temperatures may be higher with operation at higher pressures while obtaining substantially the same distillate compositions.

The solvent used in the extraction of the aqueous azelaic acid solution may be any suitable hydrocarbon solvent in which the monobasic acids sought to be extracted have sufficient solubility and which has a boiling point sufficiently different from the monobasic acids so that it may be readily recovered.

Any of the aliphatic hydrocarbon solvents in the classification of mineral spirits, such as naphtha mineral spirits with a boiling range of 80 to 200° C., are suitable, for example, Skellysolve V and Skellysolve S.

A large variety of raw materials other than pure oleic acid or commercially pure oleic acid may be treated by the process of the invention. The starting material may be mixtures of fatty acids obtained from animal fats and greases or from vegetable sources such as fatty acids derived from cottonseed oil, soybean oil, cornseed oil, etc., or fatty acids obtained from fish and marine oils. In fact, substantially any of the fats and oils occurring in nature contain sufficient oleic acid in combination with other fatty acids, either saturated or polyunsaturated, to be suitable in the cleavage oxidation process and the purification method of the invention. Of course, the greater the content of oleic acid in the feed stock, the less burden is placed upon both the production and the purification process and the greater the yield of the desired product.

The method of the invention provides a means by which highly purified azelaic acid of very low monobasic acid content and of exceptional color and color stability is provided. This, in turn, makes possible improvement in properties of derivatives of the azelaic acid in different applications such as exemplified above.

Obviously, many modifications and variations of this invention may be made without departing from the spirit and scope thereof and therefore only such limitations should be imposed as are indicated in the appended claims.

What we claim is:

1. A method of producing purified azelaic acid from the mixed oxidation products obtained by cleavage oxidation of an unsaturated acid which when oxidized produces azelaic acid, said products containing varying quantities of:
    (a) monobasic acids in the range from about $C_5$ to $C_9$, principally pelargonic acid,
    (b) monobasic acids in the range above $C_9$ up to about $C_{18}$, principally saturated higher fatty acids of $C_{14}$ to $C_{18}$ chain length, and
    (c) dibasic acids in the range from about $C_4$ to $C_{11}$, principally azelaic acid, which comprises distilling said mixed oxidation products to remove pelargonic and other monobasic acids of $C_9$ and lower carbon chain length, while leaving a residue comprising dibasic acids and monobasic acids having more than 9 carbon atoms, distilling from said residue and collecting as distillate the azelaic acid, other dibasic acids, and the bulk of the remaining monobasic acids having chain lengths higher than $C_9$ which are volatile with the said dibasic acids, dissolving said distillate in hot water to form an aqueous solution of dibasic acids contaminated with some residual quantities of $C_9$ and other higher monobasic acids, passing ozone-containing oxygen gas through said aqueous solution, thereafter extracting said aqueous solution with a non-polar hydrocarbon solvent and recovering azelaic acid from the raffinate by crystallization.

2. The method of claim 1 wherein said solvent extraction is conducted countercurrently.

3. The method of claim 1 wherein the mixed oxidation products are obtained by ozonization of an oleic acid-containing material and the crystallized azelaic acid is recovered by distillation.

References Cited

UNITED STATES PATENTS

| | | | |
|---|---|---|---|
| 2,255,421 | 9/1941 | Groll | 203—31 |
| 2,813,113 | 11/1957 | Goebel et al. | 260—537 |
| 2,916,502 | 12/1959 | Allen et al. | 260—537 |
| 2,998,439 | 8/1961 | Manley | 260—537 |

WILBUR L. BASCOMB, JR., *Primary Examiner.*